United States Patent [19]

O'Brien et al.

[11] Patent Number: 5,294,455
[45] Date of Patent: Mar. 15, 1994

[54] FOOD PRODUCT

[75] Inventors: Theresa O'Brien; Seamus McLoughlin; Liam Doyle; Eugene Corcoran, all of Tralee; Michael Browne, Listowel, all of Ireland

[73] Assignee: Petrella Limited, Sutton, Ireland

[21] Appl. No.: 865,138

[22] Filed: Apr. 8, 1992

[30] Foreign Application Priority Data

Apr. 8, 1991 [IE]  Ireland ................. 1156/91
Jan. 24, 1992 [IE]  Ireland ................. 92 0212

[51] Int. Cl.$^5$ ............................... A23L 1/05
[52] U.S. Cl. .......................... 426/573; 426/575; 426/576; 426/603; 426/604; 426/613; 426/804; 426/578; 426/583
[58] Field of Search ............... 426/573, 575, 578, 613, 426/583, 804, 603, 604

[56] References Cited

U.S. PATENT DOCUMENTS

| | | | |
|---|---|---|---|
| 4,103,037 | 7/1978 | Bodor et al. | 426/575 |
| 4,192,900 | 3/1980 | Cheng | 426/579 |
| 4,956,193 | 9/1990 | Cain et al. | 426/575 |
| 5,126,161 | 6/1992 | Poppe | 426/575 |

FOREIGN PATENT DOCUMENTS

| | | |
|---|---|---|
| 0048123 | 3/1982 | European Pat. Off. . |
| 0173555 | 3/1986 | European Pat. Off. . |
| 0279499 | 8/1988 | European Pat. Off. . |
| 0298561 | 1/1989 | European Pat. Off. . |
| 901712 | 7/1962 | United Kingdom . |
| 1142807 | 2/1969 | United Kingdom . |
| 1142808 | 2/1969 | United Kingdom . |

*Primary Examiner*—Jeanette Hunter
*Attorney, Agent, or Firm*—Sughrue, Mion, Zinn, Macpeak & Seas

[57] ABSTRACT

An edible spread comprises water, from 2% to 20% by weight of water soluble starch, particularly a combination of hydrolysed maltodextrins having a dextrose equivalent of less than 5. A water binding system comprises from 0.05% to 1.5% by weight of alginate, from 0.5% to 5.0% by weight of gelatin and a calcium source material such as calcium salts or milk protein to stabilize the spread. From 2% to 12% by weight of a soluble vegetable fibre may also be used as part of the water binding system. The spread may include up to 40% added fat.

25 Claims, No Drawings

FOOD PRODUCT

The invention relates to an edible spread-like product with or without added fat.

An acceptable edible spread should have a number of characteristics. It should be capable of being spread at domestic refrigerator temperatures and at room temperature without releasing moisture. It should release its flavour in the mouth but should also retain its structure when spread, for example on bread, biscuits or hot toast. The spread must also be stable at room temperature and have an adequate shelf life.

Up to recent times spreads generally contained from 40 to 80% fat and for reasons of product texture, spreadability, appearance, and shelf life generally consisted of water-in-oil emulsions having a continuous fat phase and a dispersed aqueous phase distributed through the fat phase. In recent years, in response to a desire to reduce fat content in diet, spreads having fat content as low as 20% have been proposed. However, there are particular technical difficulties in the manufacture of such low fat spreads in particular in obtaining and maintaining product texture, shelf life and general stability of the product.

There are many technical difficulties in the manufacture of low fat spreads. These problems include the development of spreads which have acceptable spread like textures and also adequate shelf life. Achieving both of these aims together creates particular difficulties. For example, it may be possible to develop a combination of ingredients which gives a spread-like texture but without sufficient shelf life. Similarly it may be possible to achieve shelf life, for example, by increasing the solids content in the spread but at the expense of texture.

There are a number of possible routes to the manufacture of such low fat spread products. For example, one can use maltodextrins which are marketed as fat replacers. These maltodextrins can be used to contribute a certain amount of body in a spread. However, there is a limit to the amount of maltodextrin which can be used as an excessive amount will give a starchy or pasty product. Furthermore, the use of maltodextrins on their own will not give adequate shelf life.

There is therefore a need for an improved edible spread, particularly a spread having a fat content of substantially less than 40%.

We have now, very surprisingly, been able to produce spreads having the desired characteristics with extremely low or no fat content.

According to the invention, there is provided an edible spread comprising:
  water;
  from 2% to 20% by weight of water soluble starch;
  from 0.05% to 1.5% by weight of alginate and as part of a water binding system; and
  an amount of a food compatible divalent metal ion source material sufficient to stabilise the water binding system,
  which, when pasteurized, cooled and set, forms a spread of desired consistency.

The particular combination of water soluble starch, alginate and a metal ion source material gives a product with very surprisingly good spread-like characteristics. The use, in particular, of alginate with a metal ion source material, particularly a calcium source material such as either a milk protein or calcium salts gives a product with especially good spread characteristics. This may be because the precipitation of metal ion alginate, especially calcium alginate facilitates the formation of a spread-like texture.

In a particularly preferred embodiment of the invention the spread includes from 0.1% to 5% by weight of gelatin as part of the water binding system. We have found that gelatin is particularly important in ensuring formation of a spread having an adequate shelf life.

In a particularly preferred embodiment of the invention the alginate is present in an amount of from 0.2% to 0.9%, especially, approximately 0.5% by weight of the spread. The alginate is preferably a sodium alginate such as that sold under the Trade Mark SOBALG by GRINDSTED.

In one embodiment of the invention the food compatible divalent metal ion source material is a calcium source material. However, it may be possible to use another divalent metal ion source material such as magnesium source material.

The calcium source material preferably incudes milk protein in an amount of from 0.1% to 15%, preferably from 2% to 10%, by weight of the spread. Milk protein is preferred to contribute to the flavour of the product.

Preferably the milk protein is selected from skim milk powder, buttermilk powder, whey powder, whey protein concentrate, caseinates and mixtures thereof.

Alternatively or additionally, the calcium source material may include calcium salts in an amount of from 0.005% to 5%, preferably from 0.01% to 2.0% by weight of the spread. The calcium salt is preferably selected from calcium chloride, calcium citrate, calcium lactate, calcium phosphate, calcium gluconate, calcium sulphate, calcium propionate, calcium stearate, calcium succinate, calcium tartarate, calcium sorbate, calcium acetate, calcium formate, calcium nitrate, calcium hydroxide, other food grade calcium salts and mixtures thereof.

In a particularly preferred embodiment of the invention the gelatin is present in an amount from 1.0% to 2.0% by weight. The gelatin used may, for example, be that sold under the Trade Mark GELADON G by GRINDSTED or other food grade gelatin.

In an especially preferred embodiment of the invention the water binding system includes from 1% to 15%, preferably from 2% to 12% by weight of a soluble vegetable fibre. In a preferred embodiment of the invention the vegetable fibre comprises INULIN such as that sold under the Trade Mark FIBRULINE by Cosucra. We have found that soluble vegetable fibre is particularly preferred as it contributes to the water binding properties and the texture of the product.

In a preferred embodiment of the invention the soluble starch incudes at least 1%, preferably from 3% to 15% by weight of the spread of hydrolysed starch having a dextrose equivalent of from 0 to 5. Preferably the starch comprises a mixture of soluble hydrolysed starches. Most preferably the mixture of hydrolysed starches comprises a first soluble starch having a dextrose equivalent of from 0 to 5 and a second soluble starch having a dextrose equivalent of from 0 to 5. We have found that this is particularly significant in improving the overall spread characteristics.

The low DE starch may comprise the starch sold under the Trade Mark PASELLI SA2 by Avebe (a potato maltodextrin) and/or starch sold under the Trade Mark INSTANT N-OIL II by National Starch (a tapioca maltodextrin).

In one embodiment of the invention the spread includes at least 0.5% by weight of a hydrolysed soluble starch having a dextrose equivalent greater than 5 such as Maltodextrin having a dextrose equivalent of 10 such as PASELLI MD10.

The spread may also include at least 0.1% by weight of modified starch such as the starch sold under the Trade Mark ULTRATEX 3 or 4 by NATIONAL STARCH.

The combination of ingredients described gives a product with acceptable spread characteristics. We have found that a particular texture may be achieved by modifying the amount of starches, particularly low DE starches used. It is not necessary therefore to include fat in the spread. However, if desired, up to 40% by weight of fat may be included in the spread without significantly altering its characteristics. When fat is present, preferably it is present in an amount of from 0 to 20% by weight.

The fat may be vegetable or animal fat or a mixture thereof. The fat may be natural as extracted or may be hydrogenated, interisterified or fractionated. Typical fats include butterfat, palm oil, sunflower oil, olive oil, soya bean oil, rapeseed oil, cottonseed oil, maize oil, corn oil, tallow, coconut, fish oil and the like.

The spread may also include up to 1% by weight of an emulsifier such as lecithin, monodiglycerides, esters of sugars, acids or alcohols.

The spread may, in addition, include flavouring agents such as butter, margarine, diary cheese, chocolate, hazelnut, garlic and/or savory flavours.

DETAILED DESCRIPTION OF THE INVENTION

The invention will be more clearly understood from the following description thereof given by way of example only.

The following examples yielded spreads with good spread characteristics.

In each case the ingredients were blended together (for example either using a SILVERSON mixer or an homogeniser) with sodium chloride, potassium sorbate, colour (β-carotene), flavourings, acidity regulators (lactic acid, sodium lactate) to pH 5.1 in water and pasteurised at 80° C. for one minute. All percentages are by weight of the spread.

In the case of examples 1 to 12 the solution thus formed was cooled, for example by passing it through a scraped surface heat exchanger, and set.

In the case of examples 13 and 14 the oil-in-water emulsion thus formed was cooled, for example by passing it through a scraped surface heat exchanger, and set.

Example 1
| | |
|---|---|
| 10.0% | Low DE Soluble Starch - INSTANT N-OIL II |
| 5.0% | Skim Milk Powder |
| 5.0% | Soluble Vegetable Fibre - FIBRULINE |
| 1.0% | Gelatin (GELADON G) |
| 0.5% | Alginate (SOBALG) |

Example 2
| | |
|---|---|
| 10.0% | Low DE Soluble Starch - PASELLI SA2 |
| 5.0% | Skim Milk Powder |
| 5.0% | Soluble Vegetable Fibre - FIBRULINE |
| 1.0% | Gelatin (GELADON G) |
| 0.5% | Alginate (SOBALG) |

Example 3
| | |
|---|---|
| 5.0% | Low DE Soluble Starch - INSTANT N-OIL II |
| 5.0% | Low DE Soluble Starch - PASELLI SA2 |
| 5.0% | Skim Milk Powder |
| 5.0% | Soluble Vegetable Fibre - FIBRULINE |
| 1.0% | Gelatin (GELADON G) |
| 0.5% | Alginate (SOBALG) |

Example 4
| | |
|---|---|
| 5.0% | Low DE Soluble Starch - PASELLI SA2 |
| 5.0% | Low DE Soluble Starch - INSTANT N-OIL II |
| 5.0% | Whey Protein Concentrate (35% protein) |
| 5.0% | Soluble Vegetable Fibre - FIBRULINE |
| 1.0% | Gelatin (GELADON G) |
| 0.5% | Alginate (SOBALG) |

Example 5
| | |
|---|---|
| 5.0% | Low DE Soluble Starch - PASELLI SA2 |
| 5.0% | Low DE Soluble Starch - INSTANT N-OIL II |
| 5.0% | Buttermilk Powder |
| 5.0% | Soluble Vegetable Fibre - FIBRULINE |
| 1.0% | Gelatin (GELADON G) |
| 0.5% | Alginate (SOBALG) |

Example 6
| | |
|---|---|
| 5.0% | Low DE Soluble Starch - PASELLI SA2 |
| 5.0% | Low DE Soluble Starch - INSTANT N-OIL II |
| 5.0% | Soluble Vegetable Fibre - FIBRULINE |
| 0.1% | Calcium Lactate |
| 1.0% | Gelatin (GELADON G) |
| 0.5% | Alginate (SOBALG) |

Example 7
| | |
|---|---|
| 5.0% | Low DE Soluble Starch - PASELLI SA2 |
| 5.0% | Low DE Soluble Starch - INSTANT N-OIL II |
| 5.0% | Soluble Vegetable Fibre - FIBRULINE |
| 0.05% | Calcium Chloride |
| 1.0% | Gelatin (GELADON G) |
| 0.5% | Alginate (SOBALG) |

Example 8
| | |
|---|---|
| 4.0% | Low DE Soluble Starch - INSTANT N-OIL II |
| 4.0% | Low DE Soluble Starch - PASELLI SA2 |
| 5.0% | Maltodextrin DE 10 Soluble Starch - PASELLI MD10 |
| 5.0% | Skim Milk Powder |
| 5.0% | Soluble Vegetable Fibre - FIBRULINE |
| 1.0% | Gelatin (GELADON G) |
| 0.5% | Alginate (SOBALG) |

Example 9
| | |
|---|---|
| 5.0% | Low DE Soluble Starch - INSTANT N-OIL II |
| 5.0% | Low DE Soluble Starch - PASELLI SA2 |
| 0.3% | Modified Starch - ULTRATEX |
| 5.0% | Skim Milk Powder |
| 5.0% | Soluble Vegetable Fibre - FIBRULINE |
| 1.0% | Gelatin (GELADON G) |
| 0.5% | Alginate (SOBALG) |

Example 10
| | |
|---|---|
| 5.0% | Low DE Soluble Starch - INSTANT N-OIL II |
| 5.0% | Low DE Soluble Starch - PASELLI SA2 |
| 1.0% | Gelatin (GELADON G) |
| 0.5% | Alginate (SOBALG) |
| 5.0% | Skim Milk Powder |

Example 11
| | |
|---|---|
| 5.0% | Low DE Soluble Starch - INSTANT N-OIL II |
| 5.0% | Low DE Soluble Starch - PASELLI SA2 |
| 9.0% | Soluble Vegetable Fibre - FIBRULINE |
| 0.5% | Alginate (SOBALG) |
| 5.0% | Skim Milk Powder |

Example 12
| | |
|---|---|
| 4.0% | Low DE Soluble Starch - INSTANT N-OIL II |
| 4.0% | Low DE Soluble Starch - PASELLI SA2 |
| 5.0% | Skim Milk Powder |
| 5.0% | Soluble Vegetable Fibre - FIBRULINE |
| 2.0% | Gelatin (GELADON G) |
| 0.5% | Alginate (SOBALG) |

Example 13
| | |
|---|---|
| 5.0% | Low DE Soluble Starch - PASELLI SA2 |
| 5.0% | Low DE Soluble Starch - INSTANT N-OIL II |
| 5.0% | Skim Milk Powder |
| 5.0% | Soluble Vegetable Fibre - FIBRULINE |
| 0.5% | Alginate (SOBALG) |
| 1.0% | Gelatin (GELADON G) |
| 10.0% | Fat |

Example 14
| | |
|---|---|
| 5.0% | Low DE Soluble Starch - PASELLI SA2 |
| 5.0% | Low DE Soluble Starch - INSTANT N-OIL II |

| | |
|---|---|
| 5.0% | Skim Milk Powder |
| 5.0% | Soluble Vegetable Fibre - FIBRULINE |
| 0.5% | Alginate (SOBALG) |
| 1.0% | Gelatin (GELADON G) |

The invention is not limited to the embodiments and examples hereinbefore described which may be varied in detail.

We claim:

1. An edible spread comprising:
   (a) water;
   (b) from 2% to 20% by weight of a water soluble starch;
   (c) a water binding system comprising from 0.05% to 1.5% by weight of alginate and from 0.1% to 5% by weight of gelatin; and
   (d) a food compatible divalent metal ion source material which stabilizes the water binding system,
   wherein the spread is formed by blending, pasteurizing, cooling, and setting the resulting blend to form a desired consistency.

2. A spread as claimed in claim 1 wherein the food compatible divalent metal ion source material is a calcium source material.

3. The spread of claim 2, wherein the calcium source material comprises milk protein in an amount of from 0.1% to 15% by weight of the spread.

4. The spread of claim 3, wherein the milk protein is selected from the group consisting of skim milk powder, buttermilk powder, whey powder, whey protein concentrate, caseinates and mixtures thereof.

5. The spread of claim 2, wherein the calcium source material comprises calcium salts in an amount of from 0.005% to 5% by weight of the spread.

6. The spread of claim 5, wherein the calcium salt is selected from the group consisting of calcium chloride, calcium citrate, calcium lactate, calcium phosphate, calcium gluconate, calcium sulphate, calcium propionate, calcium stearate, calcium succinate, calcium tartarate, calcium sorbate, calcium acetate, calcium formate, calcium nitrate, calcium hydroxide, other food grade calcium salts and mixtures thereof.

7. The spread of claim 1 wherein the gelatin is present in an amount of from 1.0% to 2.0% by weight.

8. The spread of claim 1, wherein the water binding system further comprises from 1% to 15% by weight of a soluble vegetable fiber.

9. The spread of claim 1, wherein the water soluble starch comprises at least 1% by weight of hydrolyzed starch having a dextrose equivalent of from 0 to 5 based on the weight of the spread.

10. The spread of claim 1, wherein the water soluble starch comprises a mixture of soluble hydrolysed starches.

11. The spread of claim 10, wherein the mixture of hydrolysed starches comprises a first water soluble starch having a dextrose equivalent of from 0 to 5 and a second water soluble starch having a dextrose equivalent of from 0 to 5.

12. The spread of claim 1, which further comprises at least 0.5% by weight of a hydrolyzed soluble starch having a dextrose equivalent greater than 5.

13. The spread of claim 1, which further comprises at least 0.1% by weight of modified starch.

14. The spread of claim 1, which further comprises from 0% to 40% by weight of fat.

15. The spread of claim 1, wherein the spread contains no added fat.

16. The spread of claim 1, which further comprises up to 1% by weight of an emulsifier.

17. The spread of claim 1, wherein the alginate is present in an amount of from 0.2% to 0.9%.

18. The spread of claim 1, which further comprises a flavoring agent.

19. The spread of claim 4, wherein the milk protein is contained in an amount of from 2% to 10% by weight of the spread.

20. The spread of claim 5, wherein the amount of calcium salts is from 0.01% to 2.0% by weight of the spread.

21. The spread of claim 1, wherein the water binding system further comprises from 2% to 12% by weight of a soluble vegetable fiber.

22. The spread of claim 1, wherein the water soluble starch comprises from 3% to 15% by weight of hydrolyzed starch having a dextrose equivalent of from 0 to 5 based on the weight of the spread.

23. The spread of claim 1, which further comprises from 0% to 20% by weight of fat.

24. The spread of claim 17, wherein the amount is about 0.5% based on the weight of the spread.

25. The spread of claim 18, wherein the flavoring agent is selected from the group consisting of butter, margarine, dairy cheese, chocolate, hazelnut, garlic, savory flavors and mixtures thereof.

* * * * *